Patented Nov. 24, 1953

2,660,577

UNITED STATES PATENT OFFICE 2,660,577

DERIVATIZATION OF STARCH WITH LACTONES

Ralph W. Kerr, Riverside, Ill., and William A. Faucette, Stoughton, Wis., assignors to Corn Products Refining Company, New York, N. Y., a corporation of New Jersey No Drawing. Application May 27, 1950,
Serial No. 164,863

27 Claims. (Cl. 260—233.5)

This invention relates, generally, to novel and useful strach products and a method of producing the same. An object of this invention is to produce starch derivatives possessing abnormally high and stable paste viscosities, as well as lack of tendency to form cohesive gels upon aging, even at relatively high consistencies. It is a further object to produce such products having in addition high paste clarity and shortness. Other objects are the production of starch ethers, starch esters, and starch compounds in which the carbohydrate molecules are cross-bonded by ether-ester linkages. A further object is to produce such starch derivatives by an economically attractive process involving the interaction of starch in a substantially dry form with reactive lactones, i. e. intramolecular esters of hydroxycarboxylic acids, preferably without the aid of added reaction medium, catalysts, or other adjuncts, which are normally required for starch derivatization. Other objects and advantages will appear hereinafter.

Starch ethers and esters of varying properties have been prepared heretofore by a number of processes employing many types of etherifying and esterifying agents and catalysts under a wide variety of conditions, but, on the whole, commercial production of starch ethers and esters has been very limited, primarily because of the high cost of their production due to the methods utilized, expensive equipment required, and difficulties and expense of purification. For example, reactions in which a Williamson synthesis is employed for etherification require extensive washing to remove the salt formed, while those employing the commercially attractive short chain alkyl epoxides require a sealed reactor because of the high vapor pressures of these reagents, and further require the use of relatively large amounts of catalysts.

The present invention requires no catalyst to effect reaction between the starch and lactone, and forms no undesirable or waste products requiring removal. Furthermore, the boiling points of the lactones at atmospheric pressure are sufficiently high to obviate the necessity of a sealed reactor, so that ordinary dry starch mixing or blending equipment, usually available in starch factories, may be employed as a reactor. Other advantages of the present invention are that relatively low ratios of derivatizing reagent to starch are required, and for industrial uses, with the exception of food uses, the products require no subsequent treatment except possibly, a pH adjustment, which can advantageously be accomplished with gaseous reagents such as ammonia vapor. For uses in edible products, only very simple washing is required, in addition to the pH adjustment, if desired or necessary. Still another advantage is that derivatization is accomplished under mild conditions of time, temperature, and pressure, particularly with the preferred reagents such as beta-propiolactone. Furthermore, by the process of this invention starch products of new, unusual, and improved properties may be obtained. Thus the present invention not only provides a process for the production of starch derivatives at very low cast as compared with prior art processes, but also enables the preparation of improved starch products heretofore unknown.

The starch derivatives of this invention wherein a significant degree of cross-bonding has occurred differ materially from starch products produced with the usual prior art cross-bonding reagents such as epihalohydrins and aldehydes, in that our improved products not only possess high paste consistency and shortness of paste flow but also yield pastes of unusual clarity. This result is unexpected and surprising, inasmuch as cross-bonding of starches, particularly corn starch, usually leads to reduced clarity of the pastes, while the clarity of pastes from our improved starch derivatives, including corn starch derivatives, is exceptionally great. This unanticipated result is extremely advantageous, since it permits production of low cost starch products well-suited for use in the manufacture of canned foods; in pie fillings, especially fruit pies wherein the acids present cause thinning of ordinary starches; and in salad dressings. The improved cross-bonded starch product of our invention is also useful in many other applications, such as textile printing pastes and alkaline dry cell fillers.

The process of the present invention comprises reacting starch with a lactone under controlled conditions of time, temperature, pH value, and reagent concentration.

The reaction presumed to take place in the process of the present invention is an opening of the lactone ring of the reagent, and, as the ring opens, the formation of an ether, ester, or ether-ester, with the hydroxyl groups of the starch molecule, as may be represented by the following equations wherein ROH and $R_1OH$ represent starch molecules and A represents any radical or group or hydrogen:

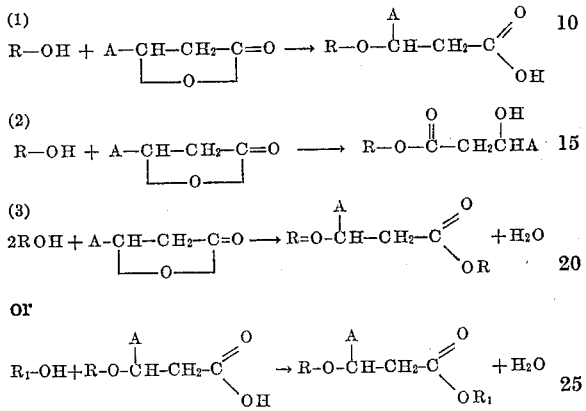

It is to be expected that under mild conditions of reaction greater derivatization efficiency will be obtained with lactones in which the heterocyclic ring containing oxygen is under strain, such as the beta-lactones illustrated above which contain a ring consisting of three carbon atoms and one oxygen atom to form a four-membered ring. It also may be expected that under mild conditions and without added catalyst, the primary reaction, in the early stages at least, is an etherification reaction, as illustrated in Equation 1 above; e. g. if beta-propiolactone is the reagent, the first product would be a carboxyethyl starch. These products, when adjusted to a pH value of about 7 to 8 and washed, will form clear pastes of relatively high viscosity and long flow, while samples taken after longer reaction periods give short bodied pastes of still higher viscosity. For example, when a paste was made from the latter product in the concentration of only 2.75 grams of starch to 100 ml. of water, the final Brabender amylograph viscosity at 25° C. was 1000 units (20 absolute poises), whereas untreated corn starch at the same concentration had a viscosity of 30 Brabender units (about 1 poise) and a 7.0 percent paste of waxy maize starch had a viscosity of 700 to 800 units (13.4 to 16.0 poises). Thus, it seems probable in view of the extraordinarily high paste viscosity and the "short" character of the paste that cross-linkage of starch molecules occurs, particularly in the later stages of the process, as illustrated in Equation 3 above.

For certain applications, a starch which gives a thick, short bodied paste, such as the product obtained when the reaction of Equation 3 above predominates, is very desirable; for other applications a starch whose paste is "long" is very desirable.

It has been indicated in our study of the reaction of starches with lactones that the etherification reaction proceeds rapidly, while the esterification reaction, and therefore cross-bonding, proceeds more slowly. It has also been indicated that the etherification reaction is less affected by lowering the temperature than is the esterification reaction.

In high polymer chemistry it is now generally believed that a polymerization involving two reagents, one of which is bi- or polyfunctional, results in a lower yield of branched or cross-bonded polymer molecules and a higher yield of unbranched polymer molecules when the molar ratio of the polyfunctional reagent is high with respect to the molar ratio of the other reagent. Conversely, a high proportion of branched or cross-bonded polymer molecules will result when the molar ratio of the polyfunctional reagent is low. An unexpected result obtained in our process is an apparent reduction in cross-bonding when the molar ratio of lactone to starch is decreased, with the result that the product appears to be almost entirely a carboxyalkyl starch ether. Therefore, by choosing properly correlated reaction conditions, it has been found possible to prepare products having properties similar to those of the "long" flowing waxy starches, but with better paste clarity and higher viscosity, or to prepare clear, superviscosity products having "short" flow characteristics.

Starches suitable for use in our invention include all varieties of starch, such as corn, tapioca, wheat, grain sorghum, etc., as well as all types or grades, such as native pearl and powdered, chemically modified starches, dextrins, thin boiling starches, and pregelatinized starches. The starch to be treated in accordance with this invention is preferably in the commercially dry state.

Although it is possible to use lactones of all of the many types of hydroxycarboxylic acids under appropriate conditions of time, temperature, pH value and reagent concentration, derivatization proceeds with greatest ease and efficiency under relatively very mild conditions with lactones in which the heterocyclic ring consists of 3 to 4 carbon atoms and one oxygen atom. The preferred reagent is beta-propiolactone.

The amount of lactone used depends upon the extent of derivatization desired, and also upon the time and temperature conditions, which are interdependent variables. In general, amounts varying from about 0.1 mole to about .01 mole per molar weight of starch are satisfactory. The molar weight of starch in the reaction of this invention is considered to be 180 since the amount of water normally associated with commercially dry starch is approximately one mole per anhydroglucose unit of the starch, and therefore, the reacting unit of the starch may be considered to be a glucose unit.

In common with other chemical reactions, the higher the temperature, the more rapid the reaction. However, in the reaction of starch with lactones, if a basic additive to control the pH is not used, the reaction mixture tends to become acidic, and if the reaction temperature is increased to about 70° to 100° C. or over, hydrolysis of the glucosidic linkages in the starch may occur as a side reaction, resulting in a product with a lowered paste viscosity.

In general, reaction times within the range of about ½ hour to about 20 hours are suitable, the exact length of time depending, as aforementioned, on the amount of reagent and degree of derivatization desired. At room temperature, reaction times within the range of about 2 to about 20 hours will generally be found to be satisfactory. At somewhat higher temperatures, e. g. about 50° C.–60° C., shorter reaction periods, within the range of about ½ hour to about 10 hours, will ordinarily be sufficient.

The factors which minimize cross-linkage, as illustrated by Equation 3 above, and yield mainly ethers, as illustrated by Equation 1 above are low temperature, short reaction times, and low concentration of reagent, i. e. lactone. Cross-linkage may be further minimized and the production of starch ethers, i. e. products yielding pastes of long flow, promoted by control of the pH value through mild in situ buffering. Suitable buffering agents are ammonium carbonate, anhydrous ammonia, sodium phosphate monobasic, sodium phosphate dibasic and mixtures of these latter two. These buffers may be applied by any suitable means. Strong bases are not recommended, since alkali starch produced by the reaction of starch and a strong base such as sodium hydroxide, does not react effectively with lactones; the alkali opens the lactone ring and forms a relatively unreactive salt.

When the desired extent of derivatization has been achieved, the pH value may be adjusted to some suitable range, e. g. about 6.5 to about 7.5, by the introduction of gaseous ammonia, if desired or necessary for the intended use of the starch. This procedure will be found satisfactory for many industrial uses of the product. Further purification, if desired, may be accomplished by simple washing of the product, or mixing the product with water, neutralizing with dilute sodium hydroxide, for example to pH 7.0 to 8.0, filtering and drying. These latter procedures, however, are inapplicable when dextrins, roll dried products, or other starch modifications wholly or partially soluble in cold water are used. For originally water soluble starch substrates, purification when desired, can be accomplished by washing the product in aqueous alcohol solutions.

The following examples, which are intended as illustrative and typical only and not in a limiting sense, will further illustrate the process of this invention:

EXAMPLE I

One hundred and eighty grams of corn starch was placed in a 1½ liter stainless steel beaker, provided with a lid and an agitator, which swept the sides and bottom of the beaker. The starch was agitated while 7.2 grams (0.1 mole) of beta-propiolactone, was sprayed in and the temperature raised to about 50° to 60° C. The reaction was continued for 6 hours and 40 minutes. At the end of this time the product was slurried in 1 liter of water, the pH value increased from a level of about 3.2 to approximately 8.3 by the addition of 5 percent sodium hydroxide solution. The product was filtered, washed twice with water, filtered, and dried.

Upon gelatinization in water, the product gave a salve-like paste of high clarity and super-viscosity. The properties of the product are as follows:

| | |
|---|---|
| Moisture _____percent__ | 12.0 |
| Ash (d. b.) [1]_____do____ | 0.1 |
| pH of paste_____ | 7.5 |
| Viscosity in absolute poises of a 2.75% paste at 25° C_____ | 20.0 |

[1] Dry basis.

The product presumably was a carboxyethyl starch cross-bonded by reason of the formation of ether-ester chains between starch molecules with the resultant formation of super-molecules of high molecular weight and viscosity.

This type of starch derivative is an excellent thickening agent for fruit pies, as it has approximately the same viscosity in both the hot and cold state after pasting, good thickening power in the presence of fruit acids, and yields clear pastes.

This starch may also be used as a thickening agent in salad dressings and mayonnaise; in textile printing pastes, which usually are very alkaline; and as the gelling agent in alkaline "dry" cells.

EXAMPLE II

Example I was repeated, except that the amount of beta-propiolactone used was 3.6 grams (0.05 mole) instead of 7.2 grams (0.1 mole). The product of this reaction had the same paste clarity, but the viscosity was less. It had the following properties:

| | |
|---|---|
| Moisture _____per cent__ | 12.0 |
| Ash (d. b.)_____do____ | 0.15 |
| pH _____ | 7.5 |
| Viscosity in absolute poises of a 2.75% paste at 25° C_____ | 5.4 |

EXAMPLE III

Example I was repeated, except that 1.8 grams (0.025 mole) of beta-propiolactone was used instead of 7.2 grams (0.1 mole). The starch derivative obtained also had good clarity but a lower viscosity than the product of Example I. The properties of this product were as follows:

| | |
|---|---|
| Moisture _____per cent__ | 12.0 |
| Ash (d. b.)_____do____ | 0.08 |
| pH _____ | 7.5 |
| Viscosity in absolute poises of a 2.75% paste at 25° C_____ | 5.0 |

EXAMPLE IV

Example I was repeated using 0.9 gram (0.0125 mole) of beta-propiolactone instead of 7.2 grams (0.1 mole), and the reaction temperature was 30° C. instead of 55° to 60° C. The product had a lower viscosity due to the use of less reagent and lower temperature than in Example III. The properties of this product were as follows:

| | |
|---|---|
| Moisture _____per cent__ | 10.0 |
| Ash (d. b.)_____do____ | 0.05 |
| pH _____ | 8.5 |
| Viscosity in absolute poises of a 2.75% paste at 25° C_____ | 1.2 |

The four preceding examples illustrate the effect of decreasing viscosity due to less cross-bonding between starch molecules with decreasing amounts of reagent. They also illustrate the remarkable reactivity of lactones with starch at commercial moisture content, without a catalyst, and even at room temperature (Example IV).

The following example shows the effect of time on the cross-linking reaction, as followed by viscosity measurements on the pastes of a series of products in a Brabender amylograph:

EXAMPLE V

The laboratory reactor used in Example I was charged with 450 grams of corn starch, and 18.0 grams of beta-propiolactone was sprayed in. The temperature was raised to 55° to 60° C. and maintained within this range for 30 minutes before the first sample was taken. Subsequent samples were taken after 60, 120, 180, 300, and 360 minutes reaction time. The samples were all adjusted to a pH value of 8.3 (which gave a final pH value of the paste of about 7.3 to 7.6), filtered, washed twice, filtered, and dried. Brabender amylograph curves were determined on 3.0 percent (dry basis) pastes. The results are shown in Table I below.

Table I

| Reaction time in min. | Viscosity at 70° C. in poises [b] | Viscosity at 96° C. in poises [c] | Viscosity after cooling to 25° C. in poises |
|---|---|---|---|
| 30 [a] | 10.0 | 3.0 | 7.8 |
| 60 [a] | 13.0 | 5.8 | 10.0 |
| 120 | 13.8 | 5.8 | 12.0 |
| 180 | 15.0 | 6.0 | 13.0 |
| 300 | 17.8 | 6.0 | 15.8 |
| 360 | 17.9 | 6.7 | 16.0 |
| Stood overnight | 20.0+ | 14.0 | 20.0+ |

[a] Pastes of these samples had longer flow than products allowed to react for longer periods. This would appear to indicate progressive cross-linkage with increasing time of reaction, which is borne out by the increase in viscosity with increasing time of reaction. Maximum paste clarity at this reaction temperature was present at 30 minutes' reaction time.

[b] During heating up and pasting of starch, the viscosity increases and reaches a maximum value at about 70° C.

[c] As the cooking temperature is raised above 70° to the final value of 96° C. the paste viscosities level off to values shown.

EXAMPLE VI

Two hundred and twenty pounds of corn starch (dry basis) was charged to a Stokes rotary vacuum drier, which is a blender type equipment provided with means to spray reactants into the agitated starch as a fog, and 10.0 pounds of beta-propiolactone was sprayed in under pressure. The blending was continued at 50° to 60° C. for 5 hours, and the treated starch allowed to stand overnight. The product was then slurried in water, adjusted to a pH value of 8.7, filtered and washed on a rotary vacuum filter, dried, and ground to pass a 100 mesh screen. Table II below presents data on the paste viscosities of this product when gelatinized by heating in the Brabender amylograph.

Table II

| Viscosity in poises | | |
|---|---|---|
| At 80° C. | At 95° C. | At 25° C. |
| 16.0 | 12.0 | 17.0 |

EXAMPLE VII

Ten grams of gamma-valerolactone were added to 360 grams of corn starch in the laboratory reactor. The starch was agitated at about 50° to about 60° C. for 6 hours and stood overnight without agitation. The pH value of the starch when slurried in water was 4.75 and it was neutralized to a pH value of 8.3, washed, filtered, and dried. This product appeared to be chiefly a starch ester, the increase in viscosity being small, indicating little cross-linking had occurred. Pastes made from this product showed no tendency toward retrogradation, in marked contrast to untreated corn starch. Therefore, although derivatization obviously took place, it may be concluded under these conditions with this lactone that the reaction of Equation 2 above appeared to predominate.

The following examples illustrate a modification of the process which tends to limit crossbonding and produce starch products having longer paste flow.

EXAMPLE VIII

Three hundred and sixty grams of corn starch was charged to the laboratory reactor, 3.6 grams of beta-propiolactone was sprayed in, and the reaction mixture agitated at 18° to 20° C. Samples were removed at 30, 150, and 360 minutes, adjusted to a pH value of 8.5 to 9.0, washed twice on the filter, and dried. Brabender amylograph curves were then obtained on 2.75% pastes. The results are set forth in Table III below.

Table III

| Reaction time, min. | Viscosity in poises | | |
|---|---|---|---|
| | At 70° C. | At 95° C. | At 25° C. |
| 30 | >0.1 | >0.1 | 1.4 |
| 150 | >0.1 | 1.0 | 2.0 |
| 360 | >0.1 | 0.9 | 2.6 |

The sample taken after 150 minutes reaction time showed good stability toward retrogradation and had a paste flow comparable to waxy maize starch pastes. A 2.8 percent paste had viscosity equal to a tapioca starch paste of the same concentration but its paste flow was not as long.

EXAMPLE IX

The reaction described in Example VI was repeated, except that the amount of beta-propiolactone used to treat 220 pounds of starch was reduced from 10.0 pounds to 2.5 pounds, the temperature was reduced to 18° C., and the reaction time decreased to 3 hours. The product was adjusted to a pH value of 10.0, washed on a vacuum filter, and dried in a tray oven. The product has the following properties:

Moisture _____ per cent__ 13.0
Ash (d. b.) _____ do____ 0.09
pH _____ 9.0
Viscosity in absolute poises of_____
  a 2.75% paste at 25° C._____ 2.2

The paste was clear and long flowing, and apparently was a simple carboxyethyl starch ether. The paste showed no tendency to retrograde, in marked contrast to pastes made from untreated corn starch.

It has been shown that a wide range of properties can be obtained by suitable choice of conditions for the reaction between starch and lactones, but this range can be further extended by using modified starches as starting materials. This is illustrated in the following examples wherein a thin boiling starch and a pyrodextrin are used as the starting materials.

EXAMPLE X

Example VIII was repeated using a 75 fluidity starch instead of the untreated corn starch. The product had a viscosity approximately one-half that of the carboxyethyl starch product from Example VIII and had "long" paste flow properties similar to an acid modified potato starch.

EXAMPLE XI

Example VIII was repeated using 360 grams of a corn pyrodextrin (25 per cent cold water soluble) and 14.4 grams of propiolactone. The product was adjusted to pH 9.4 with ammonia gas and gelatinized in the Brabender amylograph using a ratio of 225 grams product to 250 ml. of water. The untreated pyrodextrin was gelatinized for comparison at the same concentration:

Table IV

| Product | Viscosity in poises | | | |
|---|---|---|---|---|
| | At 76° C. (peak) | At 95° C. | At 65° C. | At 25° C. |
| Untreated pyrodextrin | 6.2 | 1.4 | 2.4 | 11.2 |
| Pyrodextrin derivative | 6.2 | 1.4 | 1.8 | 5.2 |

Although the two had comparable paste viscosities at higher temperatures, at this high concentration the untreated dextrin thickened rapidly (set back) on cooling whereas the derivatized dextrin remained "long" bodied and free flowing.

The following examples illustrate the use of mild in stiu buffering to minimize cross-bonding and promote the formation of starch ethers.

EXAMPLE XII

Example VIII was repeated except that anhydrous ammonia was admitted to the laboratory reactor at such a rate that the mixture was kept alkaline throughout the reaction period. The final pH value of the treated starch was 10.4. The product showed longer paste flow than the carboxyethyl starch from Example VIII.

EXAMPLE XIII

A slurry of 400 grams of corn starch in 1000 ml. of 0.28 molar ammonium carbonate was prepared and allowed to stand overnight. The starch was then filtered off, dried, and treated with lactone as in Example VIII. This product had longer paste flow than the product of Example VIII.

EXAMPLE XIV

Buffer solutions were prepared from mixtures of 2.0 molar solutions of sodium phosphate monobasic (A) and dibasic (B). Four hundred gram portions of corn starch were steeped in each of four different mixtures of these solutions, filtered, dried and reacted with lactone as in Example VIII. The compositions of the buffer solutions used, the pH values of these solutions, and the pH of the starch product after reaction with lactone are given in the following table:

Table V

| | pH of mixture | pH after reaction |
|---|---|---|
| (1) 75% A, 25% B | 5.9 | 5.75 |
| (2) 50% A, 50% B | 6.2 | 6.20 |
| (3) 25% A, 75% B | 7.2 | 7.0 |
| (4) 0% A, 100% B | 9.0 | 8.5 |

The results were as follows:
1. The product from this reaction yielded pastes almost identical with those from the product of Example VIII; pastes were relatively clear and short-bodied, forming non-cohesive gels on cooling;
2. The pastes from this carboxyethyl starch exhibited a somewhat higher clarity and longer paste flow then the pastes from the product of Example VIII;
3. The paste made from this starch was more long-bodied and free-flowing than that of (2);
4. This product cooked to a paste which had optimal free-flowing and long-body characteristics.

We claim:
1. Process for preparing starch derivatives, comprising reacting a substance from the group consisting of starch, chemically modified starch, thin boiling starch, pre-gelatinized starch, and dextrin with a lactone of an hydroxy-carboxylic acid, said lactone corresponding to the general formula

$$R-CH-(CH_2)_x-C=O$$
$$\phantom{R-CH-(CH_2)_x-}|\phantom{xx}|$$
$$\phantom{R-CH-(CH_2)_x-}O\phantom{xxx}$$

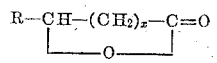

wherein R represents a radical from the group consisting of hydrogen, aliphatic hydrocarbon radicals, and substituted aliphatic hydrocarbon radicals; and x represents a whole number from the group consisting of one and two.

2. Process for preparing starch derivatives, comprising reacting a substance from the group consisting of starch, chemically modified starch, thin boiling starch, pregelatinized starch, and dextrin, in a substantially dry state, with a lactone of an hydroxycarboxylic acid, said lactone corresponding to the general formula

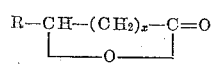

Wherein R represents a radical from the group consisting of hydrogen, aliphatic hydrocarbon radicals, and substituted aliphatic hydrocarbon radicals, and x represents a whole number from the group consisting of one and two; said reaction taking place at a temperature within the range from about room temperature to about 70° to 100° C. and for a period of time within the range from about 20 hrs. to about ½ hr.

3. Process for producing starch derivatives comprising reacting commercially dry starch and a lactone of an aliphatic hydroxycarboxylic acid from the group consisting of beta- and gamma-hydroxycarboxylic acids, the amount of said lactone being within the range of about 0.01 to about 0.1 mole per molar weight of starch, at a temperature within the range from about room temperature to about 70° to 100° C., for a period of time within the range of about ½ hour to about 20 hours.

4. Process according to claim 3 wherein said lactone is beta-propiolactone.

5. Process according to claim 3 wherein said lactone is gamma-valerolactone.

6. Process according to claim 3, wherein the pH of said starch during the reaction is within the range of about 5.5 to about 10.5.

7. Process according to claim 3, wherein ammonia is passed into the reaction mixture to maintain the pH within the range of about 5.5 to about 10.5 during the reaction.

8. Process according to claim 3, wherein said starch is treated with a buffer prior to reacting the same with said lactone, in order to maintain the pH within the range of about 5.5 to about 10.5.

9. Process for producing starch derivatives comprising reacting commercially dry starch with beta-propiolactone in an amount ranging from about 0.01 mole to about 0.1 mole per molar weight of starch, at a temperature within the range of about 50° C. to about 60° C., for a period of time within the range of about ½ hour to about 10 hours.

10. Process for producing starch derivatives comprising reacting commercially dry starch with a lactone of an aliphatic hydroxycarboxylic acid from the group consisting of beta- and gamma-hydroxycarboxylic acids in an amount ranging from about 0.01 mole to about 0.1 mole per molar weight of starch, at a temperature within the range of about 18° C. to about 70° C., for a period of time within the range of about ½ hour to 20 hours, and thereafter adjusting the pH value of the treated starch to within the range of approximately 4.0 to 10.0.

11. Process according to claim 10 wherein the pH value is adjusted by treating the starch with gaseous ammonia.

12. Process for the production of starch derivatives comprising reacting commercially dry starch with a lactone of an aliphatic hydroxycarboxylic acid from the group consisting of beta- and gamma-hydroxycarboxylic acids present in an amount within the range of about 0.01 mole to about 0.1 mole per molar weight of starch, at a temperature within the range from about room temperature to about 70°–100° C., for a period of time within the range of about ½ hour to about 20 hours; thereafter slurrying the starch derivative thus obtained in water, adjusting the pH to a value within the range of approximately 4.0 to 10.0, filtering and drying said starch derivative.

13. Process according to claim 10, wherein the pH value of the treated starch is adjusted by means of an aqueous solution of sodium hydroxide.

14. Process for the production of starch derivatives, comprising reacting commercially dry corn starch with beta-propiolactone in amount ranging from about 0.01 to about 0.1 mole per molar weight of starch, at a temperature within the range of about 30° C. to about 60° C., for a period of from about ½ hour to about 7 hours; thereafter slurrying the product in water, adjusting the pH value to within the range of about 8.0 to about 9.0, filtering, washing, and drying said product.

15. Process for the production of starch derivatives showing no tendency toward retrogradation comprising reacting commercially dry corn starch with about 0.05 mole of gamma-valerolactone per molar weight of the starch, at a temperature of about 50° C. to about 60° C. for a period of about 6 hours, then allowing the reaction mixture to stand approximately 15 hours; thereafter slurrying the product in water, adjusting the pH value within the range of about 8.0 to about 9.0, filtering, washing, and drying said product.

16. Process for the production of starch derivatives capable of forming pastes of high clarity and of a final viscosity of about 17 poises at 25° C. (measured by the Brabender amylograph on 2.75% pastes), comprising treating commercially dry corn starch by spraying the same with beta-propiolactone, in the ratio of about 10 pounds of said lactone to about 220 pounds of said starch, blending said reactants for a period of about 5 hours at a temperature of about 50° C. to about 60° C., allowing the treated starch to stand approximately 15 hours; thereafter slurrying said treated starch in water, adjusting the pH value to approximately 8.5 to 9.0, filtering, washing, drying and grinding the product to the desired screen size.

17. Process for the production of starch derivatives having good stability toward retrogradation and yielding pastes of long flow characteristics, comprising reacting commercially dry corn starch with an amount of beta-propiolactone within the range of about 0.025 to about 0.1 mole per molar weight of starch, at a temperature of approximately 18° C. to 20° C. for a period of ½ hour to about 6 hours; thereafter adjusting the pH value of the treated starch to about 8.5 to 9.0, washing and drying said starch.

18. Process according to claim 17, wherein said commercially dry corn starch is a thin boiling starch.

19. Process for the production of starch derivatives having good stability toward retrogradation and yielding pastes of long flow characteristics, comprising reacting a commercially dry pyrodextrin with an amount of beta-propiolactone within the range of about 0.025 to about 0.1 mole per molar weight of said pyrodextrin, at a temperature of approximately 18° C. to 20° C. for a period of ½ hour to about 6 hours; and thereafter adjusting the pH value of the treated pyrodextrin to about 8.5 to 9.5.

20. Process for producing starch derivatives comprising reacting a substance from the group consisting of starch, chemically modified starch, thin boiling starch, pregelatinized starch, and dextrin with a lactone of an aliphatic hydroxycarboxylic acid from the group consisting of beta- and gamma-hydroxycarboxylic acids, the amount of said lactone being within the range of about 0.01 to about 0.1 mole per molar weight of starch, at a temperature within the range from about room temperature to about 70° to 100° C., for a period of time sufficient to effect the desired degree of derivatization.

21. Process according to claim 20, wherein said starch is a thin boiling starch.

22. Process according to claim 20, wherein said starch is a pyrodextrin.

23. Starch derivative produced according to the process of claim 1.

24. Starch derivative produced according to the process of claim 2.

25. Starch derivative produced according to the process of claim 3.

26. Starch derivative produced according to the process of claim 4.

27. Starch derivative produced according to the process of claim 5.

RALPH W. KERR.
WILLIAM A. FAUCETTE.

References Cited in the file of this patent

UNITED STATES PATENTS

| Number | Name | Date |
| --- | --- | --- |
| 2,148,951 | Maxwell | Feb. 28, 1939 |
| 2,316,128 | Bock et al. | Apr. 6, 1943 |
| 2,412,213 | Groen | Dec. 10, 1946 |
| 2,461,139 | Caldwell | Feb. 8, 1949 |
| 2,474,227 | Coleman et al. | June 28, 1949 |
| 2,526,554 | Gresham et al. | Oct. 17, 1950 |

OTHER REFERENCES

Karrer—Organic Chemistry—2nd Ed., pages 250–251 (1946).